United States Patent
Akashika

(10) Patent No.: US 10,210,316 B2
(45) Date of Patent: Feb. 19, 2019

(54) INFORMATION PROCESSING SYSTEM, MOBILE TERMINAL, INFORMATION PROCESSING METHOD, INFORMATION PROCESSING PROGRAM, AND COMPUTER-READABLE RECORDING MEDIUM CONTAINING SAID PROGRAM

(71) Applicant: Rakuten, Inc., Shinagawa-ku, Tokyo (JP)

(72) Inventor: Hideki Akashika, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 755 days.

(21) Appl. No.: 14/368,616

(22) PCT Filed: Dec. 26, 2012

(86) PCT No.: PCT/JP2012/083707
§ 371 (c)(1),
(2) Date: Jun. 25, 2014

(87) PCT Pub. No.: WO2013/099974
PCT Pub. Date: Jul. 4, 2013

(65) Prior Publication Data
US 2014/0379570 A1    Dec. 25, 2014

(30) Foreign Application Priority Data
Dec. 28, 2011    (JP) ................... 2011-289861

(51) Int. Cl.
G06F 21/31    (2013.01)
G06Q 20/20    (2012.01)
(Continued)

(52) U.S. Cl.
CPC ............ *G06F 21/31* (2013.01); *B42D 25/00* (2014.10); *G06F 21/305* (2013.01);
(Continued)

(58) Field of Classification Search
CPC .......... G06Q 20/3672; G06Q 20/3574; G06Q 20/35765; G06Q 20/3674; G06Q 20/3676; G06F 7/0813
See application file for complete search history.

(56) References Cited

U.S. PATENT DOCUMENTS

| | | | | |
|---|---|---|---|---|
| 2003/0006280 A1* | 1/2003 | Seita | .................... | G06K 7/0008 235/380 |
| 2005/0113137 A1* | 5/2005 | Rodriguez | ............. | G06Q 20/28 455/558 |

(Continued)

FOREIGN PATENT DOCUMENTS

| | | |
|---|---|---|
| JP | 2003-016398 A | 1/2003 |
| JP | 2005-025618 A | 1/2005 |

(Continued)

OTHER PUBLICATIONS

International Search Report of PCT/JP2012/083707 dated Apr. 2, 2013.

(Continued)

*Primary Examiner* — Hadi S Armouche
*Assistant Examiner* — Paul E Callahan
(74) *Attorney, Agent, or Firm* — Sughrue Mion, PLLC

(57) ABSTRACT

Provided are a mobile terminal, information processing method, information processing program, and computer-readable recording medium storing the program whereby, when in a locked state, a specific function is unusable but another function is usable, thereby improving user convenience. When this mobile terminal is in a state where lock function is enabled, a function where a terminal function unit accesses an IC chip to perform settlement processing using electronic money is unavailable, but a function where the terminal function unit accesses the IC chip to perform auto-charge process using electronic money is available. As a result, when the mobile terminal is locked, a function to (Continued)

perform settlement processing as a specific function is unusable but a function to perform auto-charge process as another function is usable, thereby improving user convenience.

6 Claims, 8 Drawing Sheets

(51) Int. Cl.
*G06Q 20/32* (2012.01)
*G06Q 20/34* (2012.01)
*G06Q 20/36* (2012.01)
*G06Q 20/40* (2012.01)
*G07F 7/10* (2006.01)
*B42D 25/00* (2014.01)
*H04L 29/08* (2006.01)
*G06F 21/30* (2013.01)

(52) U.S. Cl.
CPC ....... *G06Q 20/204* (2013.01); *G06Q 20/3226* (2013.01); *G06Q 20/3227* (2013.01); *G06Q 20/352* (2013.01); *G06Q 20/353* (2013.01); *G06Q 20/354* (2013.01); *G06Q 20/3672* (2013.01); *G06Q 20/3676* (2013.01); *G06Q 20/40* (2013.01); *G06Q 20/4012* (2013.01); *G07F 7/1008* (2013.01); *H04L 67/10* (2013.01); *G06Q 20/3278* (2013.01)

(56) References Cited

U.S. PATENT DOCUMENTS

| | | | |
|---|---|---|---|
| 2007/0272752 | A1 | 11/2007 | Nakatsugawa et al. |
| 2011/0276420 | A1* | 11/2011 | White ................ G06Q 20/105 705/17 |

FOREIGN PATENT DOCUMENTS

| | | |
|---|---|---|
| JP | 2007-317076 A | 12/2007 |
| JP | 2008-191709 A | 8/2008 |

OTHER PUBLICATIONS

English Translation of International Preliminary Report on Patentability dated Jul. 10, 2014 issued in Application No. PCT/JP2012/083707.

* cited by examiner

INFORMATION PROCESSING SYSTEM, MOBILE TERMINAL, INFORMATION PROCESSING METHOD, INFORMATION PROCESSING PROGRAM, AND COMPUTER-READABLE RECORDING MEDIUM CONTAINING SAID PROGRAM

CROSS REFERENCE TO RELATED APPLICATIONS

This is a National Stage of International Application No. PCT/JP2012/083707 filed Dec. 26, 2012, claiming priority based on Japanese Patent Application No. 2011-289861 filed Dec. 28, 2011, the contents of all of which are incorporated herein by reference in their entirety.

TECHNICAL FIELD

The present invention relates to a technique that executes another function while locking a certain function in an IC module having a plurality of functions and, particularly, to a technique that executes an automatic replenishment function while locking a settlement function with electronic money.

BACKGROUND ART

A function that automatically replenishes the electronic money balance (value balance) stored in a mobile terminal such as a smartphone is known. In an electronic value management method disclosed in Patent Literature 1, a mobile terminal checks the electronic money balance with an internal IC module at regular intervals and, when it is lower than a specified balance, replenishment of electronic money by an electronic value issuance system is automatically performed.

CITATION LIST

Patent Literature

PTL 1: Japanese Unexamined Patent Application Publication No. 2005-025618

SUMMARY OF INVENTION

Technical Problem

Although the automatic replenishment function disclosed in Patent Literature 1 is convenient, there is a high risk because electronic money is automatically kept replenished. In order to prevent electronic money fraud by another person after loss or theft and reduce a risk, it is necessary to lock at least the settlement function among various function related to electronic money. If the existing IC card lock (which is sometimes referred to also as "Felica Lock", where "Felica" is a registered trademark) mounted on a mobile terminal having an IC module is used, it is possible to make the electronic money settlement function unavailable by locking the whole IC module. However, if the whole IC module is locked, the automatic replenishment function disclosed in Patent Literature 1 does not work.

In view of the foregoing, an object of the present invention is to restrict execution of a specific function involving access to specified data stored in an IC module and make another specific function involving access to the specified data available at the same time.

Solution to Problem

An information processing system according to one aspect of the present invention includes an IC module including a means configured to execute first and second data processing, and a storage means configured to store specified data used for execution of the first and second data processing in a specified area; and a mobile terminal accessible to the IC module, wherein the IC module further includes an access control means configured to impose restrictions of access to the specified data based on given authentication information, and permit access to the specified data only when the authentication information is presented, and the mobile terminal includes an authentication information storage means configured to store authentication information entered by a user into a retention means, an access restriction means configured to cause the access control means to impose restrictions of access to the specified data using authentication information acquired from the retention means as the given authentication information, and a data processing execution means configured to cause the IC module to execute the second data processing by presenting the authentication information acquired from the retention means.

In the information processing system according to one aspect of the present invention, access to specified data is restricted based on given authentication information, and the second data processing is executed when the authentication information is presented. As a result, it is possible to restrict execution of a specific function involving access to specified data stored in the IC module and execute another specific function involving access to the specified data at the same time.

A mobile terminal according to one aspect of the present invention is a mobile terminal accessible to an IC module including a means configured to execute first and second data processing, a storage means configured to store specified data used for execution of the first and second data processing in a specified area, and an access control means configured to impose restrictions of access to the specified data based on given authentication information and permit access to the specified data only when the authentication information is presented, the mobile terminal including an authentication information storage means configured to store authentication information entered by a user into a retention means, an access restriction means configured to cause the access control means to impose restrictions of access to the specified data using authentication information acquired from the retention means as the given authentication information, and a data processing execution means configured to cause the IC module to execute the second data processing by presenting the authentication information acquired from the retention means.

In the mobile terminal according to one aspect of the present invention, access to specified data is restricted based on given authentication information, and the second data processing is executed when the authentication information is presented. As a result, it is possible to restrict execution of a specific function involving access to specified data stored in the IC module and execute another specific function involving access to the specified data at the same time.

In the mobile terminal according to another aspect, the retention means may impose restrictions of access to the authentication information and permit access to the authentication information only for the data processing execution means.

In this aspect, while access to the authentication information is restricted, access to the authentication information is allowed only for the data processing execution means.

In the mobile terminal according to another aspect, the specified data may be balance data indicating a balance of electronic money, the specified area may be any one of a first storage area storing the balance data and a second storage area including the first storage area, the first data processing may be balance reduction response that writes reduced balance data into the first storage area in response to a balance data update request and transmits a processing result as a response, and the second data processing may be balance acquisition response that reads the balance data from the first storage area in response to a balance data acquisition request and transmits the balance data as a response, and balance increase response that writes increased balance data into the first storage area in response to a balance data update request and transmits a processing result as a response.

In this aspect, while the balance reduction response, which is the first data processing, is restricted, the balance acquisition response and the balance increase response, which are the second data processing, can be performed.

In the mobile terminal according to another aspect, the data processing execution means may acquire authentication information from the retention means at specified timing, transmit a balance data acquisition request by presenting the acquired authentication information and thereby cause the IC module to execute the balance acquisition response, when a balance transmitted as a response satisfies a specified condition, connect to a specified server device and request balance increase processing, and transfer a balance data update request acquired from the server device by presenting the acquired authentication information and thereby cause the IC module to execute the balance increase response.

In this aspect, the balance acquisition response can be executed, and when the balance transmitted as a response satisfies a specified condition, the balance increase response can be executed.

In the mobile terminal according to another aspect, the first data processing may be data update response that writes updated data into the specified area in response to a specified data update request and transmits a processing result as a response, and the second data processing may be data acquisition response that reads the specified data from the specified area in response to a specified data acquisition request and transmits the specified data as a response.

In this aspect, while the data update response, which is the first data processing, is restricted, the data acquisition response, which is the second data processing, can be performed.

In the information processing system according to another aspect, the specified area may be any one of a first storage area storing the specified data, a second storage area including the first storage area, and a third storage area storing data needed to be acquired before accessing the specified data.

In this aspect, the specified area may be any one of the first storage area, the second storage area, and the third storage area.

In the information processing system according to another aspect, the IC module may further include an authentication information accepting means configured to accept entry of authentication information, and the access control means may release restrictions of access to the specified data when the entered authentication information is the same as the given authentication information.

In this aspect, when the entered authentication information is the same as the given authentication information, restrictions of access to the specified data is released. It is thereby possible to prevent electronic money fraud by another person after loss or theft.

An information processing method according to one aspect of the present invention is an information processing method executed by a mobile terminal accessible to an IC module including a means configured to execute first and second data processing, a storage means configured to store specified data used for execution of the first and second data processing in a specified area, and an access control means configured to impose restrictions of access to the specified data based on given authentication information and permit access to the specified data only when the authentication information is presented, the method including an authentication information storage step of storing authentication information entered by a user into a retention means, an access restriction step of causing the access control means to impose restrictions of access to the specified data using authentication information acquired from the retention means as the given authentication information, and a data processing execution step of causing the IC module to execute the second data processing by presenting the authentication information acquired from the retention means.

In the mobile terminal according to one aspect of the present invention, access to specified data is restricted based on given authentication information, and the second data processing is executed when the authentication information is presented. As a result, it is possible to restrict execution of a specific function involving access to specified data stored in the IC module and execute another specific function involving access to the specified data at the same time.

An information processing program according to one aspect of the present invention causes a mobile terminal accessible to an IC module including a means configured to execute first and second data processing, a storage means configured to store specified data used for execution of the first and second data processing in a specified area, and an access control means configured to impose restrictions of access to the specified data based on given authentication information and permit access to the specified data only when the authentication information is presented to execute an authentication information storage step of storing authentication information entered by a user into a retention means, an access restriction step of causing the access control means to impose restrictions of access to the specified data using authentication information acquired from the retention means as the given authentication information, and a data processing execution step of causing the IC module to execute the second data processing by presenting the authentication information acquired from the retention means.

In the information processing program according to one aspect of the present invention, access to specified data is restricted based on given authentication information, and the second data processing is executed when the authentication information is presented. As a result, it is possible to restrict execution of a specific function involving access to specified data stored in the IC module and execute another specific function involving access to the specified data at the same time.

A computer-readable recording medium according to one aspect of the present invention stores an information processing program causing a mobile terminal accessible to an IC module including a means configured to execute first and second data processing, a storage means configured to store specified data used for execution of the first and second data processing in a specified area, and an access control means configured to impose restrictions of access to the specified data based on given authentication information and permit access to the specified data only when the authentication information is presented to execute an authentication information storage step of storing authentication information entered by a user into a retention means, an access restriction step of causing the access control means to impose restrictions of access to the specified data using authentication information acquired from the retention means as the given authentication information, and a data processing execution step of causing the IC module to execute the second data processing by presenting the authentication information acquired from the retention means.

In the computer-readable recording medium according to one aspect of the present invention, access to specified data is restricted based on given authentication information, and the second data processing is executed when the authentication information is presented. As a result, it is possible to restrict execution of a specific function involving access to specified data stored in the IC module and execute another specific function involving access to the specified data at the same time.

Advantageous Effects of Invention

In the information processing system according to the present invention, while access to specified data stored in an IC module is restricted in principle, access to the specified data is exceptionally permitted only when executing a specific function.

Therefore, according to the present invention, only a specific function can be available while execution of most functions involving access to specified data stored in an IC module is restricted.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

<1> Overview of Embodiment

Figure 1:
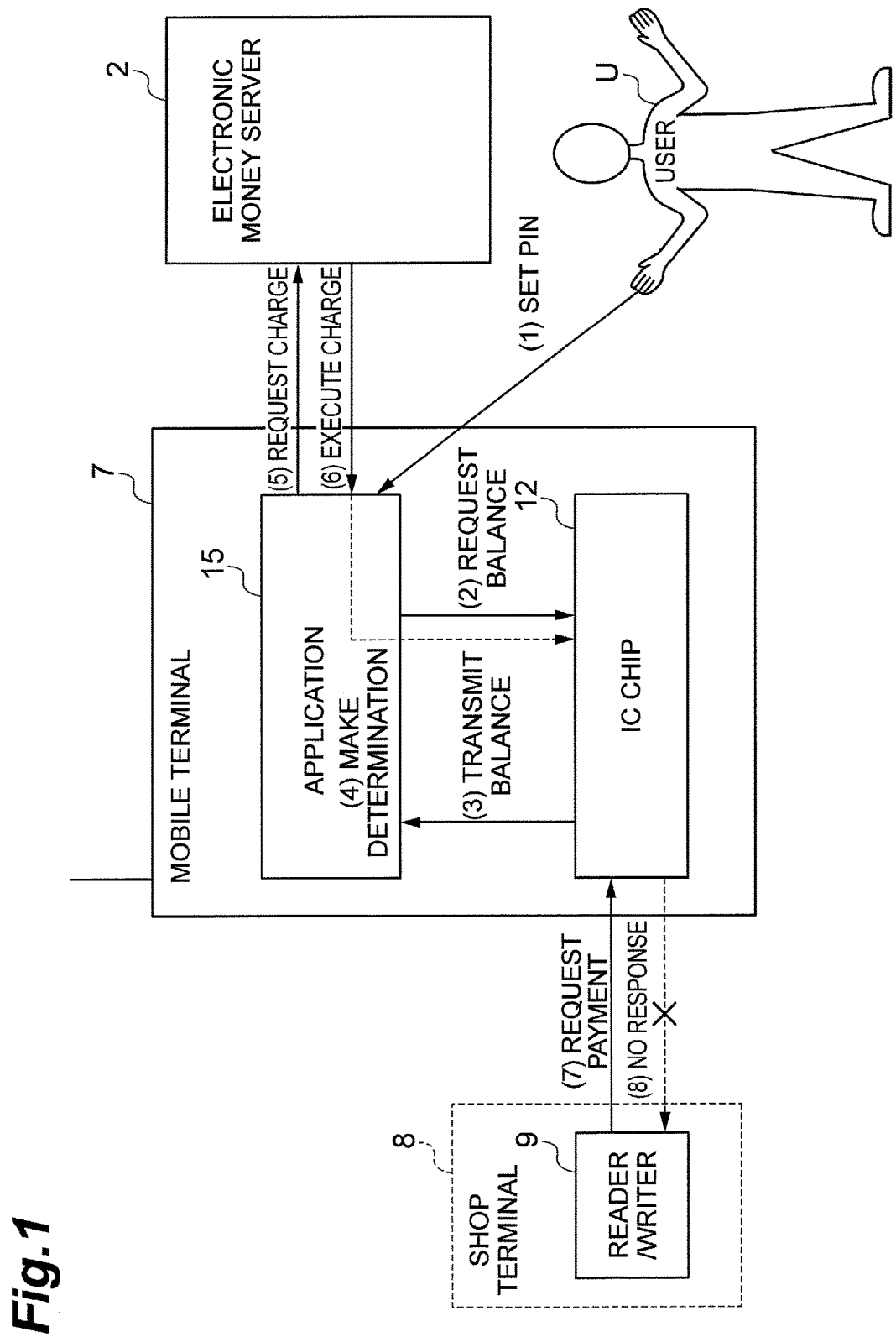
FIG. 1 is a diagram illustrating the overview of an embodiment of a mobile terminal.

First, the overview of an embodiment of a mobile terminal according to the present invention is described hereinafter with reference to FIG. 1. FIG. 1 is a diagram illustrating the overview of an embodiment of a mobile terminal 7. The mobile terminal 7 is a portable communication terminal capable of Internet communications, such as a smartphone. The mobile terminal 7 has electronic money functions such as settlement process with electronic money using a built-in contactless IC chip 12 (IC module) and balance increase and decrease processing. Further, the mobile terminal 7 has a function that imposes restrictions of access to a specific area in the IC chip 12 and restricts execution of processing performed using data stored in the area (which is referred to hereinafter as "lock function"). Further, the IC chip 12 stores balance data indicating the balance of electronic money in an internal storage area.

Further, the mobile terminal 7 can communicate with an electronic money server 2. Communication with the electronic money server 2 is performed using an application 15 (access control means, authentication information storage mans, access restriction means, and data processing execution means), which is application software to provide various services related to electronic money. The application 15 stores a balance reference amount set by a user and a specified charge amount (a specified auto-charge amount increased by auto-charge, which is described later).

A user U of the mobile terminal 7 sets appropriate PIN (authentication information) (procedural step 1). A lock function on an area that stores balance data in the IC chip 12 is thereby enabled. The application 15 stores the entered authentication information. After that, when performing auto-charge, the stored authentication information is read and used to access the IC chip 12 and request the current value balance (balance data) (procedural step 2). Then, in response to a request from the application 15, the IC chip 12 transmits the value balance to the application 15 (procedural step 3). Processing (second data processing) to acquire (refer to) the value balance by the terminal function unit 10 is thereby performed.

Next, the application 15 determines whether the value balance acquired from the IC chip 12 is equal to or less than (or is less than) a balance reference amount (procedural step 4) and, when the value balance is equal to or less than (or is less than) the balance reference amount, the application 15 requests the electronic money server 2 to make a charge for an auto-charge amount (procedural step 5). Then, receiving the request from the application 15, the electronic money server 2 performs charging (second data processing) to the IC chip 12 through the application 15 (procedural step 6). The automatic charging performed by the application 15 in this manner is referred to as auto-charge.

Because access to the balance data stored in the IC chip 12 is restricted, processing of reducing and updating the value balance cannot be performed unless authentication information set by a user is presented. Therefore, even when a reader/writer 9 included in a shop terminal 8 requests settlement processing through near-field communication to the IC chip 12 (procedural step 7), for example, there is no response (or a message indicating an error is output) and settlement processing is not carried out (procedural step 8).

Note that any one of the following lock functions can be used in this invention. In the following description, the case of using the lock function (a) is described as an example.

(a) To "hide" a specified area in the IC chip, set a hide flag to ON. In other words, "hide" an area for storing the electronic money balance or an area including that area. In this case, when an access command to the hidden area is received, the IC chip makes no response (or sends a code indicating "no area" back).

(b) Make an ON instruction for a negative flag stored in the IC chip and thereby set the negative flag of the IC chip to ON. A settlement terminal such as the shop terminal 8 checks the negative flag in the IC chip 12 at the beginning of settlement processing and, if it is ON, does not proceed to the subsequent processing and sends an error message back, to stop the electronic money function (make it unavailable).

(c) Impose restrictions of access individually on a specified storage area (an electronic money balance area or an area including that area) in the IC chip. In this case also, set an access restriction flag to ON.

<2> Details of Embodiment

Figure 2:
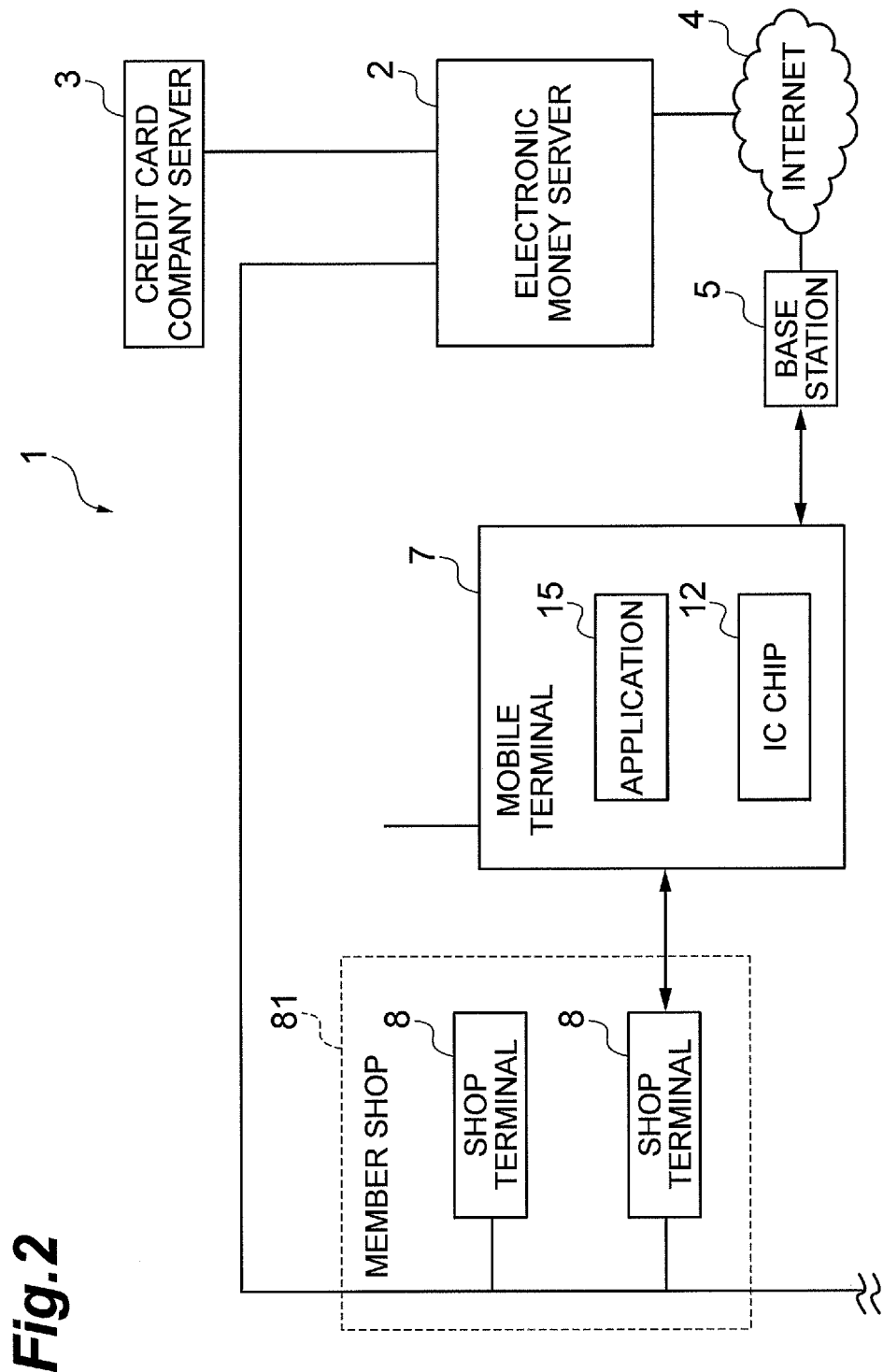
FIG. 2 is a diagram showing a network configuration of an electronic money system.

Details of an embodiment of the mobile terminal 7 are described hereinafter with reference to FIG. 2. FIG. 2 is a diagram showing a network configuration of an electronic money system 1. The electronic money system 1 includes the mobile terminal 7, the electronic money server 2, a credit card company server 3, the Internet 4, a base station 5, and a shop terminal 8 located in a member shop 81.

The mobile terminal 7 can communicate with the electronic money server 2 through the Internet 4 by wireless communication with the base station 5. Further, in the mobile terminal 7, the IC chip 12 is included, and the application 15 is installed.

The IC chip 12 is connected with an antenna for near-field communication included in the mobile terminal and can thereby perform near-field communication with the shop terminal 8. The IC chip 12 can store the value balance and can perform settlement processing by executing a command transmitted from the shop terminal 8 in the condition where the lock function of the mobile terminal 7 is disabled. Further, the IC chip 12 communicates with the electronic money server 2 through the application 15 and can make charging and settlement by executing a command transmitted from the electronic money server 2.

The application 15 carries out auto-charge on the IC chip 12 and locking control on the IC chip 12. The application 15 stores a balance reference amount and an auto-charge amount set by a user in advance.

Then, the application 15 checks the value balance of the IC chip 12 on a regular basis and, when the value balance is equal to or less than (or is less than) the balance reference amount, accesses the electronic money server 2 and requests the electronic money server 2 to make charging. In response to the request, the electronic money server 2 transmits a command to the IC chip 12 through the application 15 and thereby charges the IC chip 12.

Further, the application 15 can accept entry of PIN by a user U of the mobile terminal 7, and when it receives a valid PIN, performs control to enable the function of perform settlement processing by the IC chip 12. Specifically, in the restriction mode where the lock function of the mobile terminal 7 is effective, when the application 15 receives a valid PIN, it switches the mode to a normal mode where settlement processing by the IC chip 12 can be performed. Note that the application 15 can retain the PIN entered by a user U of the mobile terminal 7, and by reading and using the PIN according to need, the application 15 temporarily releases the lock function and executes the auto-charge function.

The electronic money server 2 is a server that manages distribution of values in the electronic money system 1. The electronic money server 2 collects log data indicating charging and settlement records from the shop terminal 8 on a regular or irregular basis. Then, the electronic money server 2 aggregates the collected log data and log data at charging to the IC chip 12 and settlement by the IC chip 12 together and makes correspondence with the distribution of values.

The member shop 81 is a business, such as a retail store or a restaurant, that provides items and services, getting paid from users. The member shop 81 is a member of a federation to use an electronic money service provided by the electronic money system 1 and includes one or a plurality of shop terminals 8.

The shop terminal 8 performs near-field communication with the IC chip 12 and, in the condition where the lock function of the mobile terminal 7 is disabled, transmits a command to the IC chip 12 and makes settlement. The shop terminal 8 transmits log data describing the processing with the IC chip 12 to the electronic money server 2 on a regular or irregular basis.

The credit card company server 3 is a server for a credit card company to manage settlement processing with a credit card. The user U of the mobile terminal 7 (see FIG. 1) is under contract with a credit card company and has registered the user's credit card number with the electronic money server 2. When the electronic money server 2 charges the IC chip 12, the credit card company server 3 performs settlement processing for that amount with the credit cart number of the user U.

Figure 3:
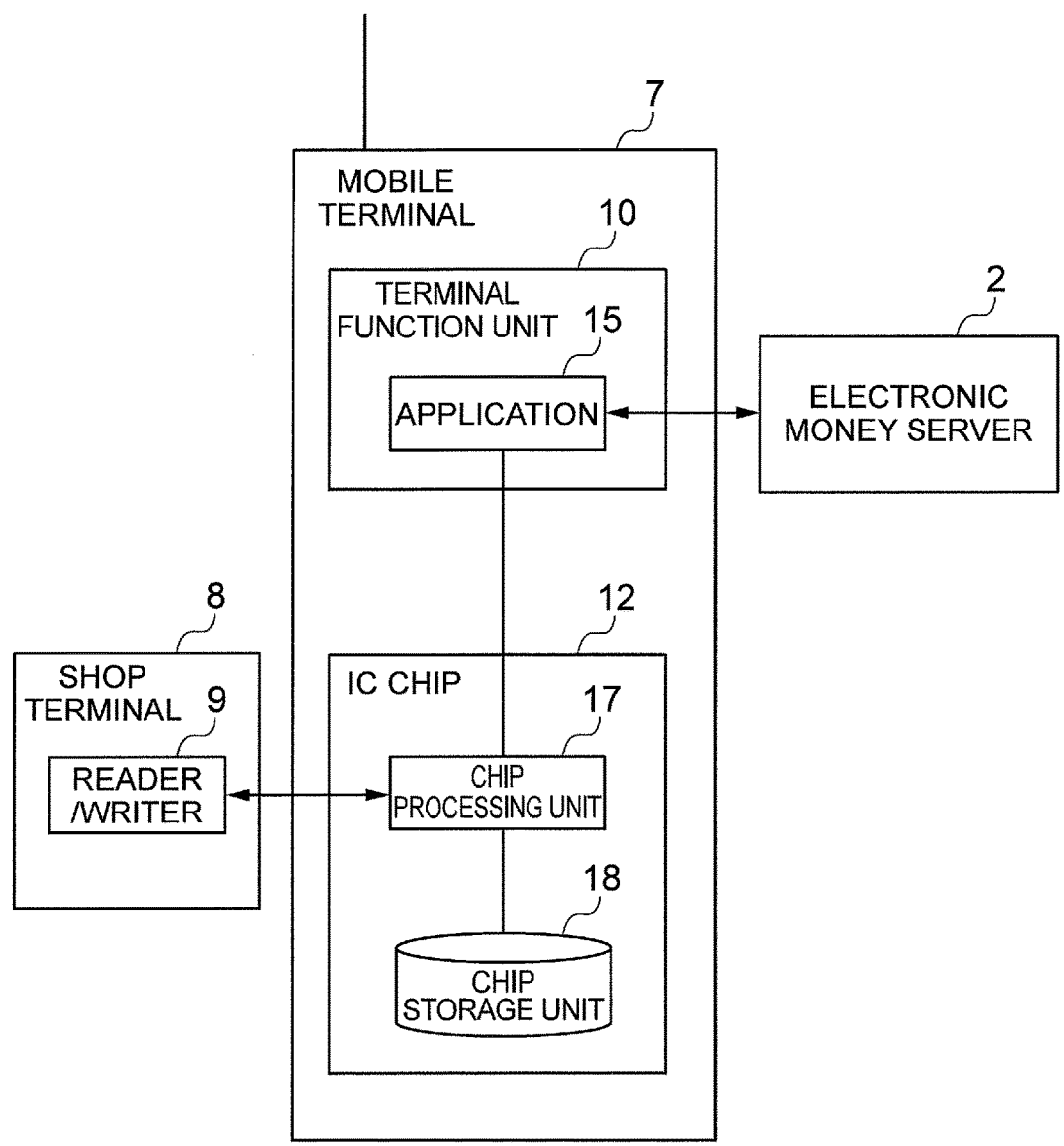
FIG. 3 is a diagram showing a functional configuration of a mobile terminal.
Figure 4:
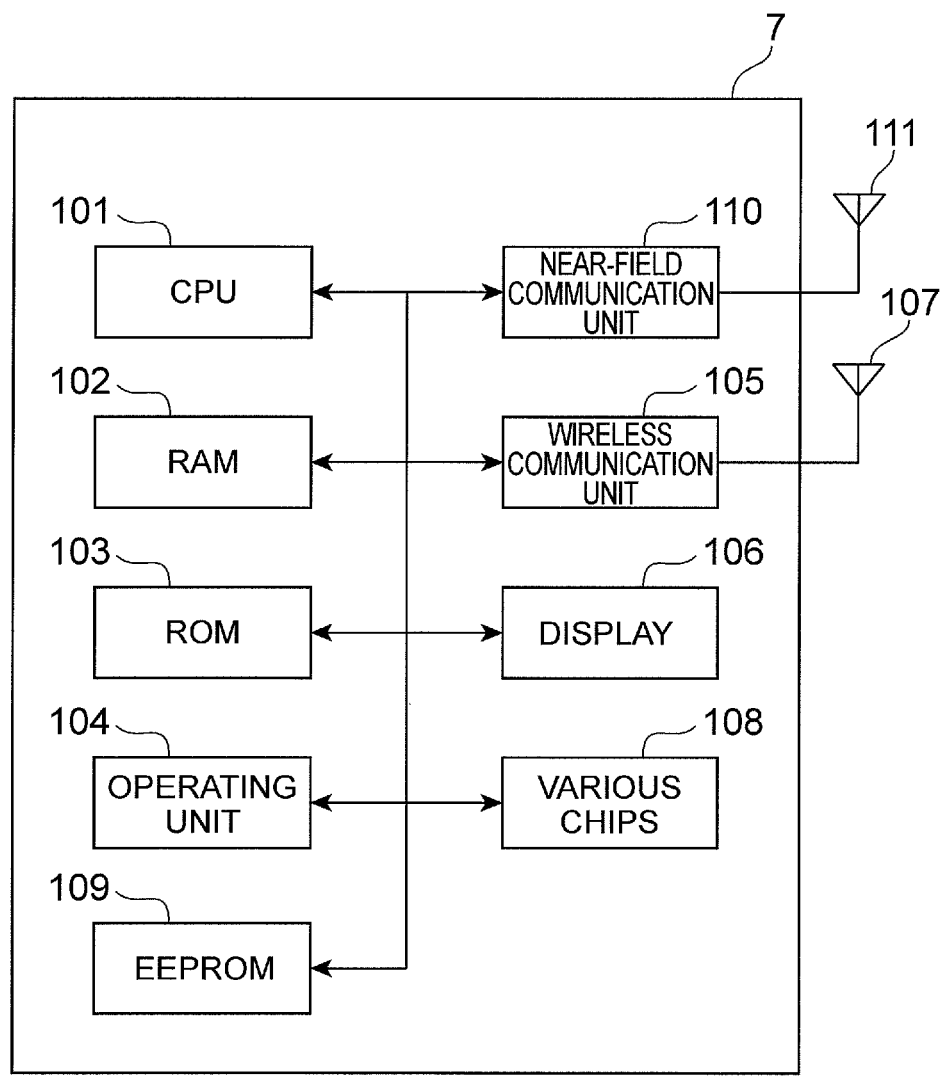
FIG. 4 is a diagram showing a physical configuration of a mobile terminal.

The configuration of the mobile terminal 7 is further described with reference to FIGS. 3 and 4. FIG. 3 is a diagram showing a functional configuration of the mobile terminal 7, and FIG. 4 is a diagram showing a physical configuration of the mobile terminal 7. As shown in FIG. 4, the mobile terminal 7 is a small computer terminal that includes hardware such as a CPU 101 (Central Processing Unit), a RAM 102 (Random Access Memory), a ROM 103 (Read Only Memory), an EEPROM 109 (Electrically Erasable Programmable Read Only Memory), an operating unit 104, a wireless communication unit 105, a near-field communication unit 110, a display 106, antennas 107 and 111, and various types of chips 108 as principal physical components. The functions of the mobile terminal 7 are exerted by the operation of those functional components.

Further, as shown in FIG. 3, the mobile terminal 7 includes an application 15, a terminal function unit 10 (access control means, authentication information storage means, access restriction means) having the application 15, and an IC chip 12 capable of communication with the terminal function unit 10 as principal functional components, and the IC chip 12 includes a chip processing unit 17 (data processing execution means) that connects with the antenna for near-field communication built in the mobile terminal 7 and a chip storage unit 18 that is controlled by the chip processing unit 17.

The IC chip 12 has the function as a computer including a CPU (Central Processing Unit), a RAM (Random Access Memory), a ROM (Read Only Memory), an EEPROM and the like. As described later, the terminal function unit 10 also has the function as a computer, and, in the mobile terminal 7, two computers are capable of communications with each other.

The chip storage unit 18 has a plurality of storage areas where restrictions are imposed on connections and communications (access) by the application 15 and stores electronic data such as a value balance and log data. The value balance is the amount of currently stored electronic money. The log data is log data records of processing performed for electronic money, such as charging, settlement and balance inquiry. The configuration to store electronic data by the chip storage unit 18 is described later.

The chip processing unit 17 accesses the chip storage unit 18 in response to an instruction from the reader/writer 9 in the shop terminal 8 or the application 15 in the mobile terminal 7 and executes specified processing.

The terminal function unit 10 is a computer including a CPU, a ROM, a RAM, an EEPROM, a touch screen, a speaker, a microphone and the like. The terminal function unit 10 can connect and communicate with the IC chip 12 and can also wirelessly communicate with the base station 5 (see FIG. 2). In the EEPROM, the application 15 is installed.

The application 15 can communicate with the electronic money server 2 using a communication function of the mobile terminal 7. Then, the application 15 accepts entry by the user U (see FIG. 1) and performs user registration and auto-charge setting on the electronic money server 2 and carries out auto-charge in cooperation with the electronic money server 2.

Further, the application 15 can connect and communicate with the IC chip 12 by the terminal function unit 10. Thus, in the state where the lock function of the mobile terminal 7 is enabled, the application 15 temporarily releases the lock function by reading and using the stored authentication information, and reads the value valance from the IC chip 12 by entering a balance inquiry command to the IC chip 12, performs charging using the value balance, and reads the log data by entering a log data inquiry command.

Further, the application 15 stores the balance reference amount set by the user U (see FIG. 1). The balance reference amount is the amount of money that is used as a reference for carrying out auto-charge. The application 15 acquires the value balance by entering a balance inquiry command to the IC chip 12 on a regular basis (for example, at a specified cycle such as every several hours) and, when it determines that the value balance is equal to or less than (or is less than) the balance reference amount, initiates an auto-charge operation.

In this case, the application 15 accesses the electronic money server 2 and makes a request for auto-charge. The application 15 then enters a chip command transmitted from the electronic money server 2 in response to the request into the IC chip 12 and makes the IC chip 12 perform charging.

<3> Electronic Data Storage Configuration by Chip Storage Unit 18

Figure 5:
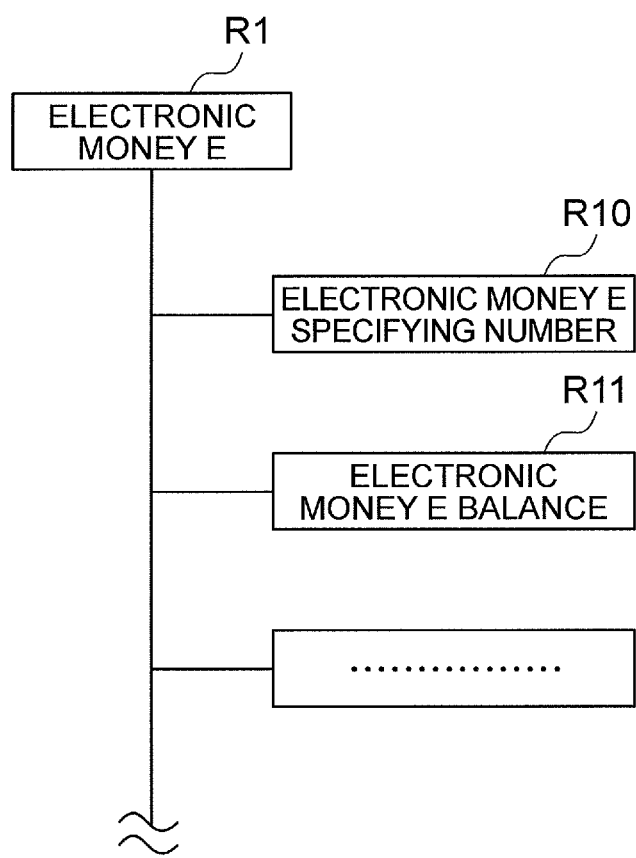
FIG. 5 is a diagram illustrating an electronic data storage configuration by a chip storage unit.

The configuration to store electronic data by the chip storage unit 18 is described hereinafter with reference to FIG. 5. FIG. 5 is a diagram illustrating an electronic data storage configuration by the chip storage unit 18. The chip storage unit 18 has a plurality of storage areas where restrictions are imposed on connections and communications by the terminal function unit 10.

The storage area in this embodiment has a hierarchical structure. A storage area R1 (second storage area) includes storage areas R10 (third storage area), R11 (first storage area) and so on, and the storage areas R10, R11 and so on are located at the lower hierarchical level of the storage area R1. In the storage area R1, information that uniquely identifies each of several types of electronic money (which is referred to as "electronic money E" in this example) is stored.

Further, in the storage area R11 located at the lower level of the storage area R1, the value balance that can be used when making settlement with the "electronic money E" is stored. Further, in the storage area R10, a specifying number that needs to be acquired in advance when connecting to another storage area located at the lower level of the storage area R1 by the application 15 is stored. For example, when PIN entered into the chip processing unit 17 by the user U of the mobile terminal 7 using the application 15 and the specifying number are the same, connections and communications to the plurality of storage areas located at the lower level of the storage area R1 by the application 15 become possible.

<4> Procedure of Auto-Charge Processing

Figure 6:
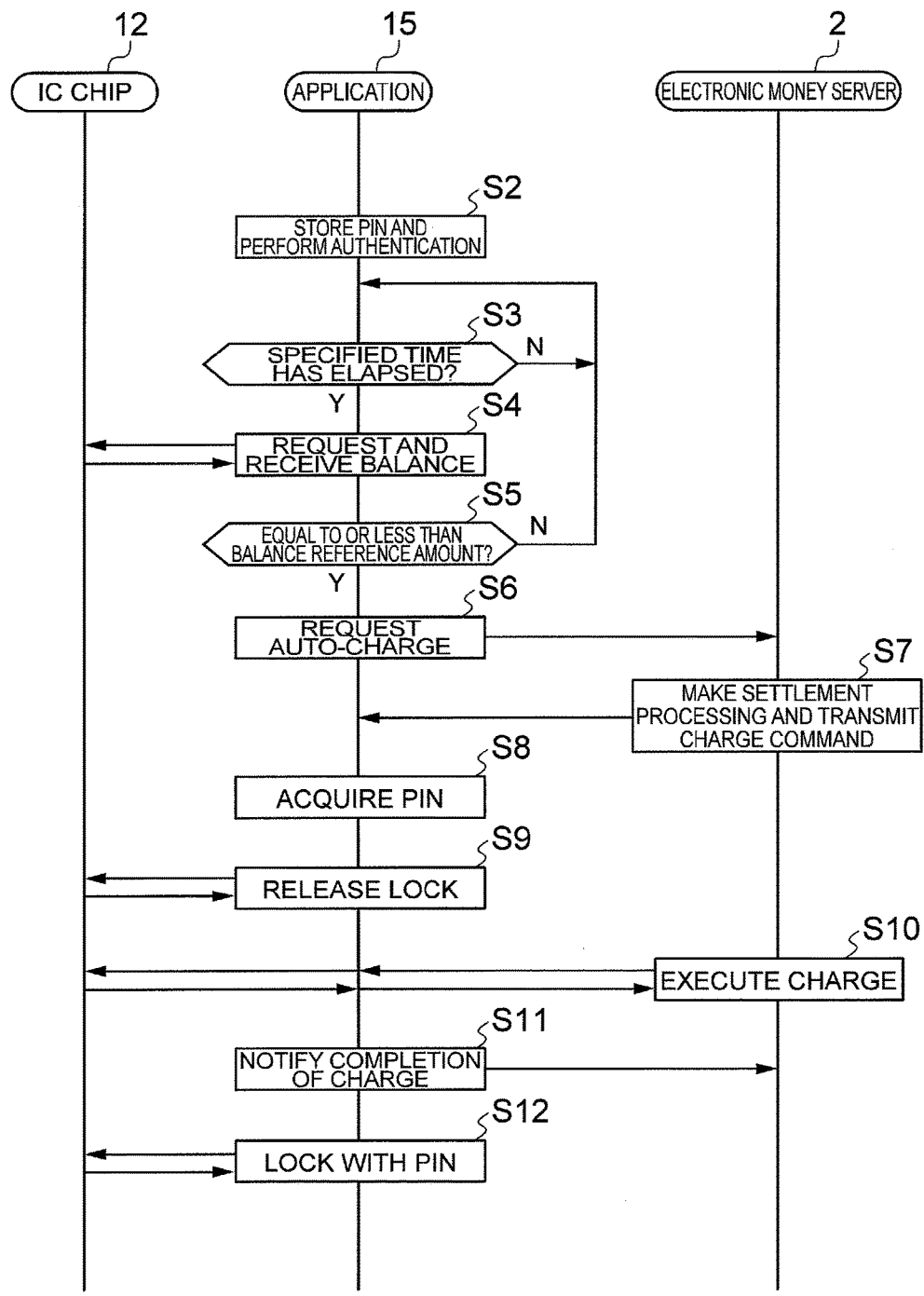
FIG. 6 is a flowchart illustrating a procedure of auto-charge processing by a mobile terminal.

A procedure of auto-charge processing (terminal function management method) by the mobile terminal 7 is described hereinafter with reference to FIG. 6. FIG. 6 is a flowchart illustrating a procedure of auto-charge processing by the mobile terminal 7.

In the procedure shown in FIG. 6, it is assumed that the user U of the mobile terminal 7 has entered an appropriate PIN to the application 15 of the mobile terminal 7, and the application 15 stores the entered PIN and performs authentication as to whether the entered PIN is valid or not. The application 15 determines whether a specified time has elapsed from the previous checking of the value balance (for the initial time, from the start of the auto-charge function) or not (which is, whether it is specified timing or not) (Step S3).

When a specified time has not elapsed, the application 15 continuously checks whether a specified time has elapsed in Step S3. On the other hand, when a specified time has elapsed, the application 15 enters a balance inquiry command to the IC chip 12 and thereby requests a notification of the value balance (Step S4, connection step).

Receiving the balance inquiry command from the application 15, the IC chip 12 reads the value balance from the chip storage unit 18 and transmits it to the application 15. The application 15 acquires the value balance from the IC chip 12 (Step S4, control step) and then compares the value balance with the previously stored balance reference amount and determines whether the value balance is equal to or less than (or is less than) the balance reference amount or not (that is, whether a specified condition is met or not) (Step S5).

When the value balance is not equal to or less than (or is less than) the balance reference amount, the application 15 returns to the processing of Step S3. On the other hand, when the value balance is equal to or less than (or is less than) the balance reference amount, the application 15 accesses the electronic money server 2 and requests auto-charge (Step S6).

In response thereto, the electronic money server 2 accesses the credit card company server 3 and performs settlement processing for the auto-charge amount with the credit card number registered by the user U (Step S7).

Then, when the application 15 receives a charge command from the electronic money server 2, it reads and acquires the previously stored PIN (Step S8), accesses the IC chip 12 and transmits a command to release the lock (Step S9). In response thereto, the IC chip 12 notifies the completion of releasing the lock to the application 15 (Step S9). Then, the electronic money server 2 enters a charge command to the IC chip 12 through the application 15 (Step S10).

Receiving the charge command from the application 15, the IC chip 12 executes the command and increases the value balance by the amount of auto-charge (Step S10). Then, the application 15 notifies the completion of auto-charge to the electronic money server 2 (Step S11).

After that, the application 15 accesses the IC chip 12 and transmits a command to enable the lock function (Step S12). In response thereto, the IC chip 12 notifies the completion of enabling the lock function to the application 15 (Step S12).

Although auto-charge is carried out as a result that PIN for permitting only auto-charge is entered to the mobile terminal 7, because settlement processing by the IC chip 12 is not permitted, even if the reader/writer 9 such as a POS (Point Of Sales) register installed in the shop terminal 8, for example, requests settlement processing to the IC chip 12, settlement is not carried out (access restriction step).

<5> Module Configuration of Terminal Function Management Program

Figure 7:
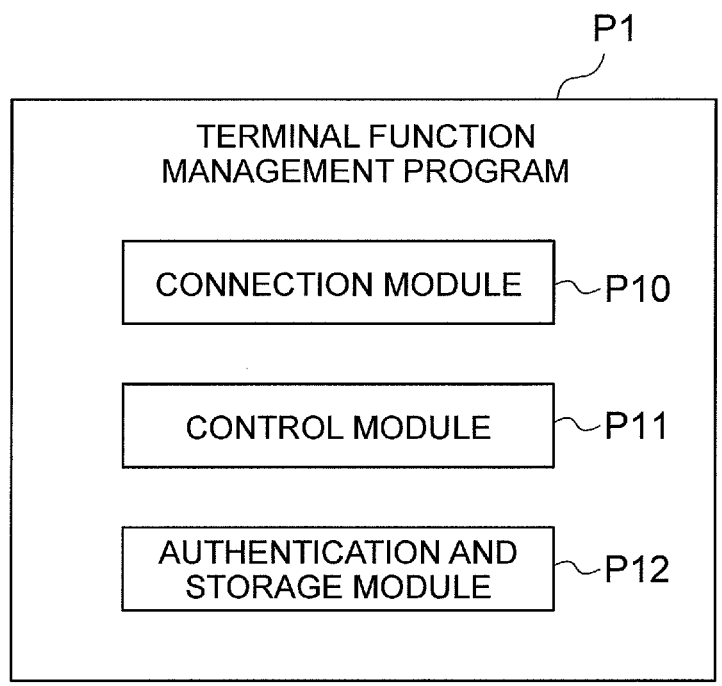
FIG. 7 is a module configuration diagram of an information processing program.

A module configuration of a terminal function management program that causes a computer to function as the mobile terminal 7 having the lock function is described hereinafter with reference to FIG. 7. FIG. 7 is a module configuration diagram illustrating a module configuration of a terminal function management program P1 that causes a computer to function as the mobile terminal 7.

As shown in FIG. 7, the terminal function management program P1 includes a connection module P10, a control module P11, and an authentication and storage module P12.

The connection module P10 is a part that exercises control over the function to execute operations of various information. By executing the connection module P10, the function of the terminal function unit 10 described above is implemented. The function implemented by executing the control module P11 is the same as the function of the application 15 described above. The functions implemented by executing the authentication and storage module P12 are the same as the functions of the chip processing unit 17 and the chip storage unit 18 described above.

The terminal function management program P1 is provided in the form of being recorded in a static manner on a recording medium such as CD-ROM, DVD-ROM or semiconductor memory, for example. Further, the terminal function management program P1 may be provided as a data signal superimposed onto a carrier wave through a communication network.

<6> Alternative Example

Figure 8:
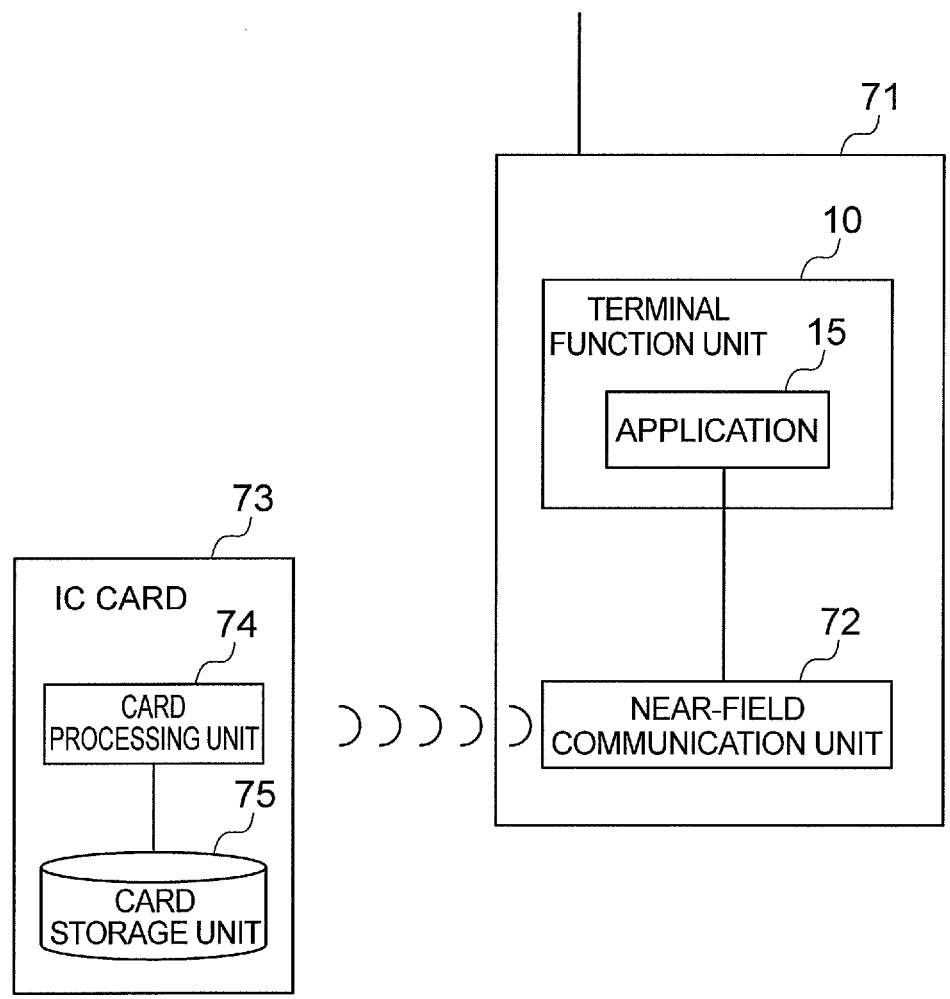
FIG. 8 is a diagram showing a functional configuration of a mobile terminal according to another embodiment.

Although the case where the IC chip 12 is included in the mobile terminal 7 is described in the embodiment according to the present invention, the location of the IC chip 12 is not particularly limited, and a flat plate IC card 73 having the same function as the IC chip 12 may exist separately from a mobile terminal 71 as shown in FIG. 8, for example.

In this case, the IC card 73 includes a card processing unit 74 that has the same function as the chip processing unit 17 and a card storage unit 75 that has the same function as the chip storage unit 18. Then, a near-field communication unit 72 included in the mobile terminal 71 performs near-field communication (NFC) with the IC card 73, so that the lock function of the IC card 73 can be enabled and disabled and auto-charge can be carried out by the application 15 that accepts user input.

Further, although an example in which the lock function is enabled and disabled by entering PIN of the user U is described in the embodiment according to the present invention, the timing for switching between enabling and disabling the lock function is not particularly limited. For example, a function that can measure the current location using GPS (Global Positioning System) may be mounted on the mobile terminal 7, and the lock function may be automatically disabled when entrance to a shop (or area) where the shop terminal 8 is located is obtained by positioning, and the lock function may be automatically enabled when exit from the shop (or area) is obtained by positioning.

Further, in the embodiment according to the present invention, an example in which the lock function is enabled and disabled by entering PIN is described based on specific technological specifications. The present invention is not limited to this example, and can be implemented in any form in conformity with technological specifications of a settlement system to be applied.

INDUSTRIAL APPLICABILITY

According to the embodiment, it is possible to make a specific function unavailable and another function available in a locked state, thereby enhancing the convenience for a user.

REFERENCE SIGNS LIST

1 . . . electronic money system, 2 . . . electronic money server, 3 . . . credit card company server, 4 . . . Internet, 5 . . . base station, 7,71 . . . mobile terminal, 8 . . . shop terminal, 9 . . . reader/writer, 10 . . . terminal function unit, 12 . . . IC chip, 15 . . . application, 17 . . . chip processing unit, 18 . . . chip storage unit, 72 . . . near-field communication unit, 73 . . . IC card, 74 . . . card processing unit, 75 . . . card storage unit, 81 . . . member shop, P1 . . . information processing program, P10 . . . connection module, P11 . . . control module, P12 . . . authentication and storage module, R1,R10,R11 . . . storage area, U . . . user

The invention claimed is:

1. A mobile terminal comprising:
an integrated chip (IC) configured to store a balance of an electronic value, wherein access to the IC module for executing processes is restricted when the IC module is in an access restriction state, execution of the processes access the stored balance of the electronic value and the processes include settlement processing;
storage configured to store authentication information previously entered by a user to initiate a plurality of restrictions of access to the IC module;
at least one memory operable to store program code; and
at least one processor operable to read the program code and operate as instructed by the program code, the program code including:
  reading code configured to cause at least one of said at least one processor to read, from storage, the stored authentication information when executing a second process related to electronic money that is different from settlement processing with the stored balance of the electronic value while the IC module is in the access restriction state;
  release code configured to cause at least one of said at least one processor to, when executing the second process, release one of the plurality of restrictions of access to the IC module for the second process using the stored authentication information, wherein releasing restriction of access for the second process permits only the second process to access the IC module and restricts the processes other than the second process from accessing the IC module; and
  resume code configured to cause at least one of said at least one processor to resume the restriction of access for the second process upon completion of execution of the second process, the completion of execution of the second process following the release of the restriction of access for the second process, wherein the release code is further configured to cause at least one of said at least one processor to release the initiated restrictions of access using the stored authentication information.

2. The mobile terminal according to claim 1, wherein the second process further involves increasing the balance of the electronic value stored in the IC module.

3. The mobile terminal according to claim 1, wherein the storage is configured to store authentication information previously entered by the user and authenticated, to initiate restrictions of access to the IC module.

4. The mobile terminal according to claim 1, wherein the program code further includes:

request code configured to cause at least one of said at least one processor to, when a predetermined time has elapsed, request and receive the balance from the IC module; and recharge code configured to cause at least one of said at least one processor to, when the received balance is less than or equal to a reference amount, execute the settlement processing to auto-charge the balance with a predetermined value.

5. An information processing method performed by a computer, the method comprising:

storing authentication information previously entered by a user to initiate restrictions of access to an integrated chip (IC) module of a mobile terminal, wherein the IC module is configured to store a balance of an electronic value, wherein access to the IC module for executing processes is restricted when the IC module is in an access restriction state, execution of the processes access the stored balance of the electronic value and the processes include settlement processing;

reading the stored authentication information when executing a second process related to electronic money that is different from settlement processing with stored balance of the electronic value while the IC module is in the access restriction state;

when executing the second process while the IC module is in the access restriction state, releasing one of the plurality of restrictions of access to the IC module for the second process using the read stored authentication information, wherein releasing restriction of access for the second process permits only the second process to access the IC module and restricts the processes other than the second process from accessing the IC module;

resuming the restriction of access for the second process upon completion of execution of the second process, the completion of execution of the second process following the release of the restriction of access for the second process, wherein the releasing of the initiated restrictions of access is performed using the stored authentication information.

6. A non-transitory computer-readable recording medium having stored thereon a program which when executed by a computer, causes the computer to:

store authentication information previously entered by a user to initiate restrictions of access to an integrated chip (IC) module of a mobile terminal, wherein the IC module is configured to store a balance of an electronic value, wherein access to the IC module for executing processes is restricted when the IC module is in an access restriction state, execution of the processes access the stored balance of the electronic value and the processes include settlement processing;

read the stored authentication information when executing a second process that is different from the settlement processing with the electronic value and involves access to the IC module while the IC module is in the access restriction state;

when executing the second process while the IC module is in the access restriction state, release a restriction of access for the second process using the stored authentication information, wherein releasing restriction of access for the second process permits only the second process to access the IC module and restricts the processes other than the second process from accessing the IC module;

resume the restriction of access for the second process upon completion of execution of the second process, the completion of execution of the second process following the release of the restriction of access for the second process, wherein the release of the initiated restriction of access is performed using the stored authentication information.

* * * * *